United States Patent [19]

Roman

[11] Patent Number: 4,708,591
[45] Date of Patent: Nov. 24, 1987

[54] BLADED AIRCRAFT ROTOR WITH FLEXIBLE BLADE MOUNTINGS

[76] Inventor: Stephan Roman, 81 Beardsley Rd., Shelton, Conn. 06484

[21] Appl. No.: 818,938

[22] Filed: Jan. 15, 1986

[51] Int. Cl.⁴ ...................... B64C 27/35; B64C 27/52
[52] U.S. Cl. ................................. 416/102; 416/134 A; 416/138; 416/141; 416/148
[58] Field of Search ................... 416/102, 148, 134 A, 416/138 A, 140 A, 141, 135 B

[56] References Cited

U.S. PATENT DOCUMENTS

| | | | |
|---|---|---|---|
| 2,163,893 | 6/1939 | Schairer | 416/102 |
| 2,961,051 | 11/1960 | Wilford et al. | 416/102 |
| 3,080,002 | 3/1963 | Du Pont | 416/102 |
| 3,082,826 | 3/1963 | Doman et al. | 416/148 |
| 4,203,709 | 5/1980 | Watson | 416/141 X |
| 4,297,078 | 10/1981 | Martin | 416/140 A X |
| 4,323,332 | 4/1982 | Fradenburgh | 416/102 X |
| 4,326,834 | 4/1982 | Ostrowski | 416/134 A |
| 4,477,225 | 10/1984 | Burkam | 416/134 A |
| 4,566,856 | 1/1986 | Miller | 416/134 A |
| 4,575,358 | 3/1986 | Ferris | 416/134 A |

FOREIGN PATENT DOCUMENTS

| | | | |
|---|---|---|---|
| 466336 | 7/1950 | Canada | 416/102 |
| 363642 | 2/1939 | Italy | 416/148 |
| 489420 | 7/1938 | United Kingdom | 416/148 |

*Primary Examiner*—Everette A. Powell, Jr.
*Attorney, Agent, or Firm*—Eugene Chovanes

[57] ABSTRACT

A bladed aircraft rotor is disclosed having blades mounted by means of flexible devices providing freedom for blade motions, at least in the flapping sense and in the pitch-change sense, without employment of flapping or pitch bearings or pivots, the rotor also being provided with a central bearingless joint for transmitting thrust forces while providing freedom for angular movement of the rotor as a whole about a center point on the axis of rotation. A constant velocity torque-transmitting system is also provided.

2 Claims, 13 Drawing Figures

BLADED AIRCRAFT ROTOR WITH FLEXIBLE BLADE MOUNTINGS

BACKGROUND AND STATEMENT OF OBJECTS

This invention relates to bladed aircraft rotors, for example bladed helicopter sustaining rotors, and while various aspects of the invention are adapted to and useable in other bladed rotors, such as a so-called tail rotor of a helicopter for controlling the aircraft in yaw, the invention is herein described and illustrated as embodied in a helicopter sustaining rotor.

In conventional aircraft sustaining rotor systems, particularly power-driven helicopter rotor systems, it has been customary to employ rotor blade mounting pivots, usually including at least two pivots for each blade, i.e., a blade flapping pivot, and a pitch change pivot. So-called drag pivots are also quite commonly employed. The blade pivots have been utilized extensively for the purpose of providing freedom for the required blade motions, such as the flapping motion, the pitch change motion, and the lead-lag motions of the blades, those various motions being desirable in various flight operations, particularly in controlled maneuvering and translational flight. While the blade pivot structures referred to have served those purposes, the employment of such pivots involves expensive manufacturing costs and requires costly maintenance, and in addition, represents potential safety hazards in the operation of such aircraft.

In order to eliminate the disadvantages incident to the employment of blade mounting pivots, certain flexible blade mounting arrangements have been proposed, as disclosed, for example, in my prior U.S. Pat. No. 4,266,912, issued May 12, 1981, and U.S. Pat. No. 4,502,840, issued March 5, 1985, the disclosures of which are incorporated herein by reference.

In the '912 patent, there are disclosed flexible straps (herein referred to as flex straps) employed for connecting the root ends of the rotor blades to a hub structure, the straps providing freedom for various blade motions with respect to the hub structure, including motions in the flapping plane, lead-lag motions, and pitch change motions. In the '840 patent, flex straps for mounting the blades are also disclosed, together with controllable pitch change mechanism.

The present invention contemplates employment of flex strap arrangements and pitch control mechanisms of the kind disclosed in my prior patents above-identified, but in addition, the present application is concerned with a number of improvements in rotors of this type in which blade mounting pivots are not used.

In considering one aspect of the present invention, it is first noted that the required flapping motions of the rotor blades represents substantial motions in the flapping plane, such flapping motions originating from various sources, including differential lift compensation at opposite sides of the rotor in translational flight, and also extensive motions in the flapping plane resulting from imposition of the cyclic pitch control, with resultant change in attitude of the aircraft, which frequently requires quite large additional flapping motions superimposed upon those resulting from differential lift compensation in translational flight.

With the foregoing in mind, the present invention contemplates the employment not only of the flex straps above referred to, but also of a flexible joint at the center of the rotor or rotor hub mechanism, which flexible joint will accommodate conjoint equal and opposite flapping motions of the blades such as are frequently encountered in maneuvering control of the aircraft. By the employment of this central flexible joint, the extent of flapping motions required to be accommodated by the flex straps is greatly reduced, so that, in effect, the overall flapping motions are divided and distributed between two different mechanisms, instead of relying solely upon the flex straps for all of the flapping motion accommodation.

For the above purpose, the invention contemplates employment of a spherical center joint through which the blades are connected with a central mounting structure, for instance, the rotor drive shaft, and as will be explained more fully hereinafter, the form of the central flexible joint employed not only accommodates and absorbs a portion of the flapping motions of the blades, but also is resistant to deflection in a direction parallel to the axis of rotation, and, therefore, serves as the load transmitting component between the body of the aircraft and the sustaining blades The foregoing accommodation of different portions of the flapping motions by different mechanisms is of importance in connection with the utilization of the flex straps, because the reduction in the overall flexibility requirements of the flex straps makes possible the employment of a wider range of materials in the fabrication of the straps themselves.

In addition, the employment of the central spherical flexible joint accommodating a portion of the flapping motions of the blades results in the concentration and handling of the equal and opposite flapping motions of the blades at opposite sides of the rotor about the center point of the central joint. Since this center point lies on the axis of rotation of the rotor, this diminishes the Coriolis effect which would otherwise be set up as a result of the total flapping action being absorbed by the flex straps, as will be explained more fully hereinafter.

In accordance with another aspect of the present invention, a novel form of torque transmission mechanism is employed between the drive shaft for the rotor and the rotative parts of the hub structure, this drive transmission comprising flexible sheet material in the form of bellows mounted above and below the plane of connection of the rotor blades to the central flexible joint. Edges of the bellows are respectively connected with the drive shaft and the blade mounting parts of the rotor, thereby providing a constant torque drive system, even when the blades occupy equal and opposite flapping positions at opposite sides of the rotor. By the employment of bellows both above and below the plane of the blade mounting, the flapping motions of the blades provided by the central joint are not only accommodated, but in addition, the torque loads are divided between the upper and lower bellows, thereby making possible the employment of economical flexible sheet material in the formation of the bellows.

BRIEF DESCRIPTION OF THE DRAWINGS

How the foregoing objects and advantages are obtained will appear more fully in referring to the accompanying drawings in which.

DETAILED DESCRIPTION OF THE DRAWINGS

Figure 1:
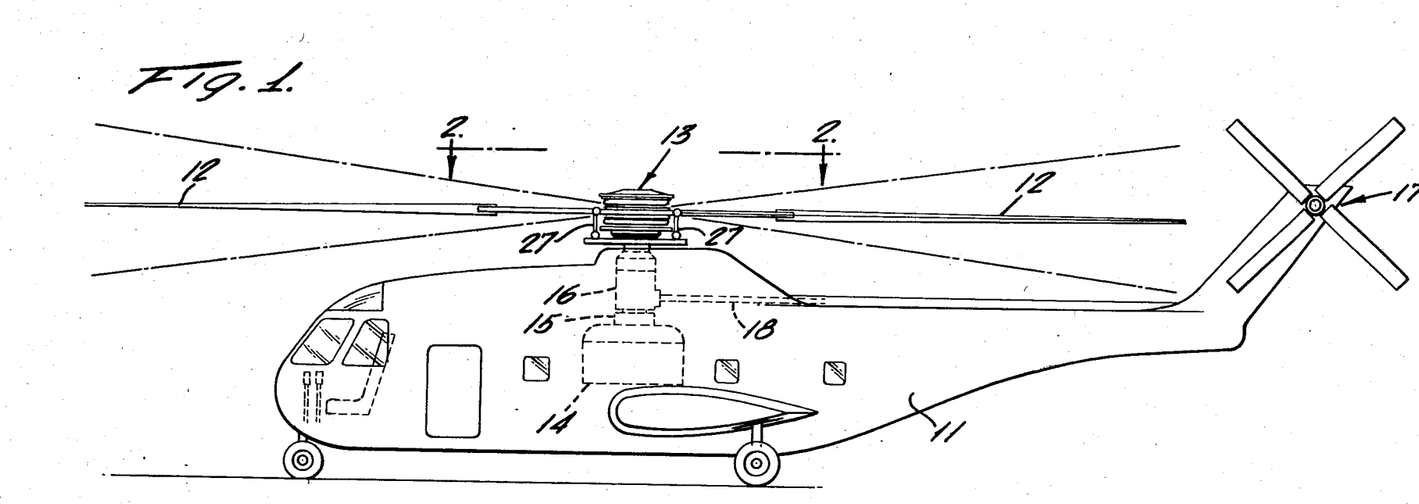
FIG. 1 is an outline side elevational view of a helicopter embodying the improvements provided according to the present invention.

In a helicopter such as shown in FIG. 1, the sustaining rotor is mounted for rotation about an upright axis above a body structure such as indicated at 11, the sustaining rotor comprising a plurality of blades 12 extending radially from the central hub structure indicated in general at 13. While any of a wide variety of drive systems may be included in such a helicopter, FIG. 1 indicates a driving engine 14 mounted on an upright axis, the drive system preferably including a disconnectable clutch, for instance, in the region indicated at 15, which may also embody an overrunning clutch so that in the event of engine failure, the rotor may be turned autorotatively. A gearing interconnection 16 may be provided between the rotor drive shaft and a tail rotor such as indicated generally at 17, as commonly provided on helicopters for the purpose of yaw control. A drive shaft 18 may extend from the gear box 16 to the tail rotor 17, and the tail rotor may be provided with appropriate control mechanism, such as blade pitch control, in order to counteract rotor driving torque and also to steer the aircraft in yaw.

Figure 2:
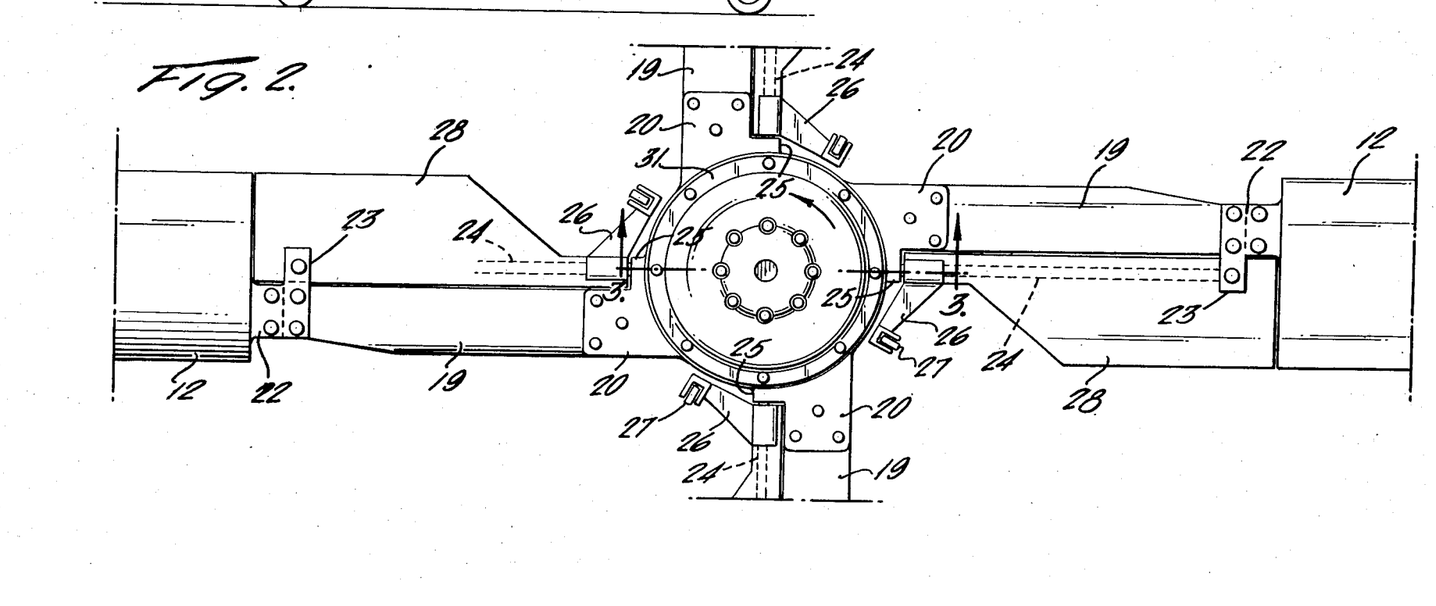
FIG. 2 is an enlarged fragmentary plan view of the central hub structure and portions of the root end mounting parts for the blades of a four-bladed rotor.

As will be understood from FIG. 2, the rotor of this embodiment includes four blades, two of which appear at 12. Each blade has a flex strap 19 at the inner end of the blade, the straps being connected with the forked blade mounting fittings 20, four such fittings being provided at the periphery of a mounting ring for the blades, herein referred to as a blade retention ring, this ring being shown at 21 in FIGS. 3, 5 and 6.

As is brought out in my prior patents above-identified, the flex straps 19 employed in the rotor system herein disclosed are adapted to provide for blade motions in several different senses. Thus, the flex straps are constructed to provide freedom for flapping motion of the rotor blades, i.e., motion of the blades in a generally vertical direction transverse to the mean plane of rotation thereof. In addition, such flex straps may also provide for pivotal motion of the blades in the plane of rotation, i.e., in the lead-lag sense.

Still further, the flex straps may be relied upon to provide freedom for pitch change motion of the blades, i.e., change in the pitch angle of the blades under the control of a pitch control system as disclosed, for example, in my prior U.S. Pat. No. 4,502,840 above referred to. This provision for pitch change of the blades provides for employment of rotor control by cyclic pitch change in known manner, providing for inclination of the plane of rotation of the rotor in any desired direction, for instance, in the forward direction for establishing translational flight. As will be seen in FIG. 2, a fitting 22 is connected with each blade between the flex strap and the blade itself, this fitting having a rearwardly projecting lug 23 providing for connection with the pitch control rod 24 which extends inwardly toward the rotor hub and which is journaled adjacent to the hub as indicated at 25. A pitch control arm 26 is secured to each of the pitch control rods 24, this pitch control arm serving as a means for turning the rod 24 and thus turning the fitting 22 connected with the root end of the blade, this, in turn, resulting in change in the pitch angle of the blade, as provided for by the torsional flexibility of the flex strap 19.

The pitch arms 26 may be connected by means of links 27 extending downwardly for connection with the rotative portion of the cyclic pitch control swash plate or other similar mechanism providing for the desired cyclic pitch control of the rotor blades. The pitch control mechanism preferably also provides for conjoint controlled vertical movement of the pitch control links 27, thereby providing for collective pitch change of all of the blades in the same sense, as is required under various operating conditions, including vertical ascent and descent. This collective pitch control may also provide for a mean pitch setting suitable for autorotative operation of the rotor in the event of engine failure.

As seen in FIG. 2, a streamlined sheath or enclosure 28 may be provided in the region to the rear of the flex strap 19 of each blade and enclosing the pitch rod 24. This streamlined enclosure may be secured to the lugs 23 and, therefore, moveable therewith during the pitch control operations.

Turning now to the illustration of the rotor hub structure as appears in FIGS. 3 to 7 inclusive, it will be seen that each of the forked blade mounting fittings 20 projects radially outwardly from the blade retention ring 21. The blade retention ring 21, in turn, is mounted on a central shaft indicated at 29 comprising an inner rotative part of the hub structure, which also includes the outer tubular shaft 30 which is driven by the engine 14 shown in FIG. 1 through the appropriate gearing and clutch connections.

Figures 3, 4, 5:
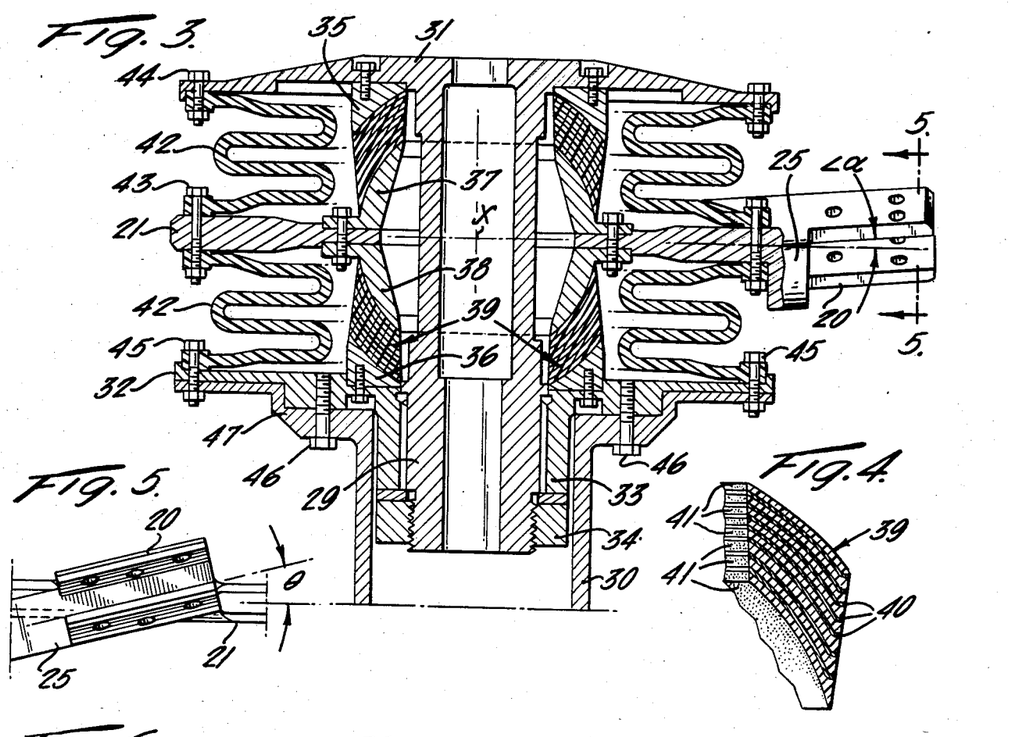
FIG. 3 is a vertical sectional view through the hub structure employed in FIGS. 1 and 2, including the root end blade mounting arrangement, the central flexible joint, and the driving bellows above and below the plane of blade attachment.
FIG. 4 is an enlarged fragmentary sectional view of a portion of a joint preferably employed at the center of the hub structure.
FIG. 5 is a fragmentary view taken substantially as indicated by the section line 5—5 in FIG. 3, illustrating the inclination of the blade mounting fittings.
Figure 6:
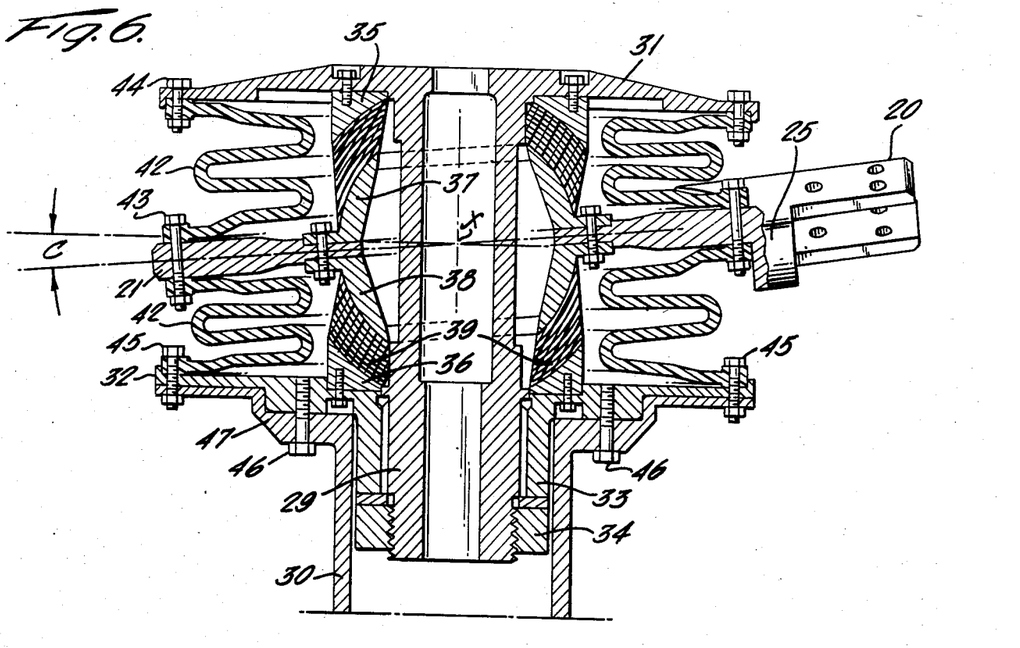
FIG. 6 is a view similar to FIG. 3 but illustrating an inclined or tilted position of the rotor as a whole.
Figure 7:
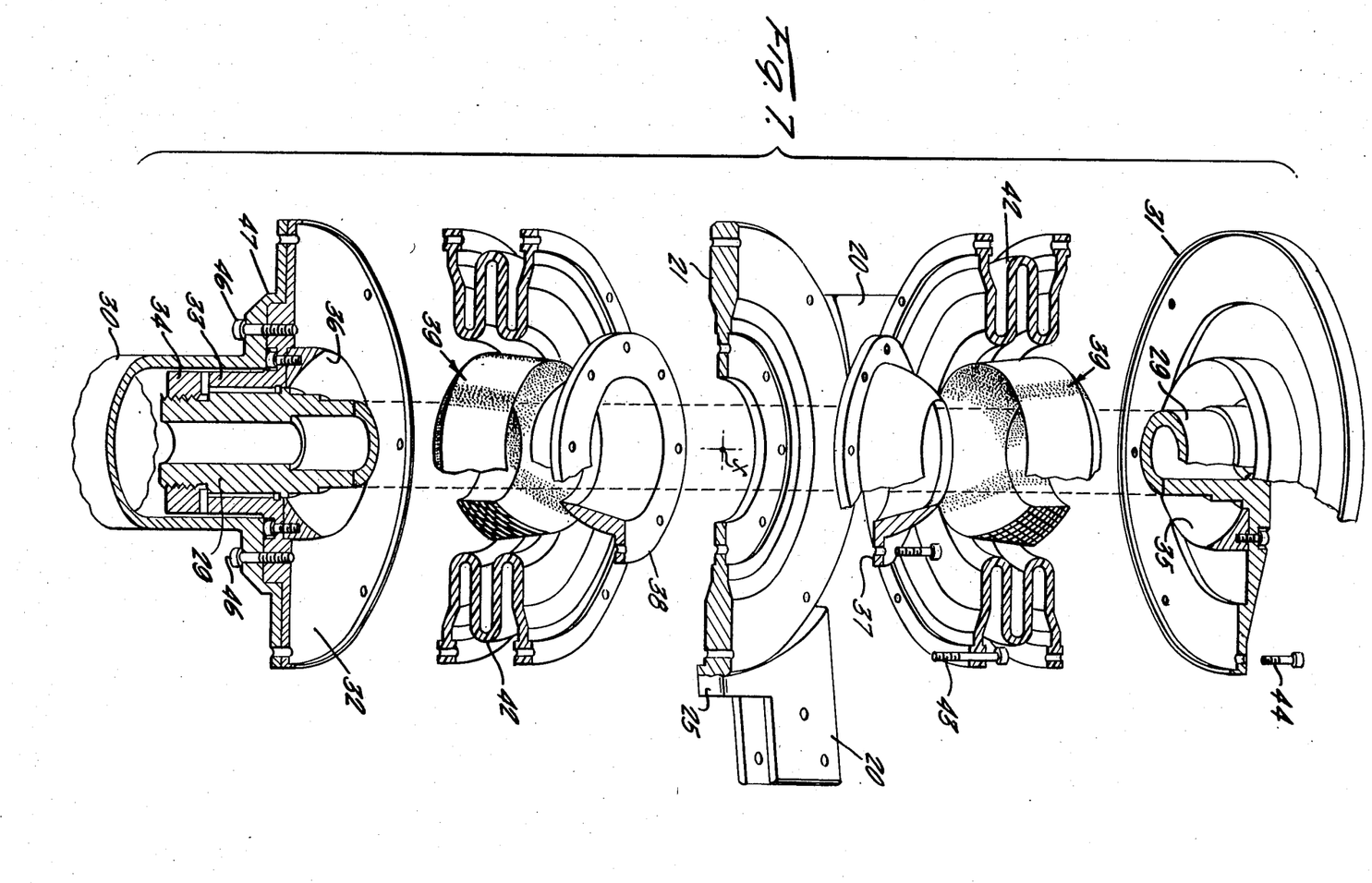
FIG. 7 is a vertically exploded view of portions of the rotor shaft and of the blade mounting parts associated with that shaft.

The blade retention ring 21, in accordance with the present invention, is connected with the central shaft 29 by means of an elastomeric joint including various of the components now to be described. Thus, as seen in FIGS. 3, 6 and 7, the central shaft 29 is connected at its upper end with a disc part 31 lying in a plane transverse to the axis of the shaft 29. A disc part 32, having a central sleeve 33, is removably secured to the lower end of the shaft 29 by means of the threaded ring 34.

At the lower side of the upper disc part 31, there is provided an annular abutment 35 having an abutment surface concavely and spherically curved about a center point x (see particularly FIGS. 3 and 6) on the axis of rotation in the mean plane of the blade retention ring 21. Similarly, an annular abutment 36 is mounted on the upper side of the disc part 32 having an abutment surface concavely and spherically curved about the center point x on the axis of rotation in the mean plane of the blade retention ring 21.

The blade retention ring 21 is provided with upper and lower abutment devices 37 and 38, these abutment devices having convexly spherically curved abutment surfaces spaced from but concentric with the surfaces on the abutment devices 35 and 36, and thus also centered on the center point x. An elastomeric joint structure generally indicated at 39 - 39 intervenes between the concavely curved and convexly curved surfaces of the abutment devices 35 - 37 and 36 - 38. This elastomeric joint may be formed of a variety of materials, but preferably comprises multiple alternate spherical layers of elastomeric and metallic materials bonded to each other. The elastomeric layers provide for yielding relative motions of the intervening metallic layers and, in this way, provide freedom for restrained tilting motions about the center point x, while resisting axial motions in a direction coincident with the upright axis of rotation of the rotor. The axial thrust or lift of the rotor is thus transmitted to the mounting or drive shaft 30 for the rotor. This joint preferably also prevents lateral shift of the blade retention ring in the plane of rotation of the blades, i.e., in directions transverse to the axis of rotation. FIG. 4 is a fragmentary illustration of the alternating spherical layers employed in the joint 39, i.e., the metallic layers 40 and the rubber or other elastomeric layers 41.

This joint 39 thus provides freedom for tilting motion of the blade retention ring 21 in any direction, but, at the same time, substantially inhibits displacement motion of the blade retention ring 21 either in a direction in the plane of rotation of the rotor or in a direction parallelling the axis of rotation of the rotor. The central joint 39 thus contributes freedom for angular motion of the blades, particularly in the flapping plane, and thereby provides freedom for tilting or inclination of the mean plane of rotation of the rotor in any direction about the central point x. In consequence of this freedom, when the plane or rotation is inclined downwardly at one side of the rotor and inclined upwardly at the other side of the rotor, for instance, in translational flight when the plane of rotation of the rotor is tilted downwardly in the front and upwardly at the rear, this tilting of the rotor blades can be accommodated by the central joint 39 and need not require reliance upon flexibility of the flex straps 19. The flexibility of the flex straps in the flapping plane, therefore, need not be as great as would be the case where the central elastomeric joint 39 is not provided, and this is of advantage from the standpoint of wear of materials and also from the standpoint of the flexibility and other characteristics of the materials to be employed in the fabrication of the flex straps.

In connection with the mounting of the rotor blades on the blade retention ring 21, attention is directed to FIGS. 3 and 5 which illustrate preferred preset blade angles. It will be noted that the fittings 20 are positioned to receive the inner ends of the flex straps at a somewhat upwardly coned angle, for instance, an angle (a) of the order of 3 or 4 degrees above the horizontal, thereby establishing a pre-cone angle for the rotor blades from which the blade flapping action would extend above and below, in accordance with the various forces influencing the flapping action. In addition, it is preferred that the blade mounting fittings be arranged to pre-establish a pitch angle ($\theta$) of the rotor blade of the order of about 13 to 15 degrees, as is indicated in FIG. 5. In this way, the normal cyclic and collective pitch ranges would represent approximately equal deflections from the pre-established angles for all normal flight conditions.

It will be seen that in the absence of some other torque connection between the blade retention ring and the rotor drive shaft 29 - 30, the elastomeric joint 39 - 39 between the blade retention ring and the central rotor shaft would have to carry the rotor driving load. However, it is contemplated according to the invention that provision be made for torque or driving interconnection independent of the elastomeric joint 39 - 39, thereby relieving the elastomeric joint 39 - 39 of any substantial rotative torque forces. For this purpose, the present invention provides a novel drive system, herein referred to as a "soft" hub, interconnecting the driven shaft 30 of the rotor hub structure and the blade retention ring 21. As seen in FIGS. 3, 6, and 7, this torque transmissions mechanism comprises a pair of flexible bellows 42 - 42, one positioned above the blade retention ring 21 and the other below the blade retention ring 21. Both of these bellows are secured, as by bolts 43, to the blade retention ring. The upper bellows is connected by bolts 44 with the peripheral portion of the disc part 31. The lower bellows is connected by bolts 45 with the disc part 32, this latter disc part also being secured by bolts 46 to the annular ring 47 which is connected or integral with the upper end of the rotor drive shaft 30.

The bellows 42 - 42 are formed of sheet-like material which is transversely flexible but which is resistive to deflection in the plane of sheet material. Materials suitable for this purpose may comprise various materials having reinforcement fibers embedded therein. For example, appropriate materials for this purpose are resin materials such as melamine formaldehyde and phenol formaldehyde resins, together with reinforcing fibers, for example, boron, graphite, fiberglass and polyamide fibers, such as the aramid polymers known under the tradename KEVLAR. For various purposes, it may also be desirable to employ combinations of fibers and still further to employ such combinations of fibers in resin materials of various types, according to the requirements of the particular installation. Further commercial examples are Narmco 5225/Celion 12 K; American Cyanimide 5143 and 5143LRS; and Ferro E293FC and Narmco 5225.

Comparison of FIGS. 3 and 6 will show the deflection of the bellows accompanying tilting movement of the blade retention ring 21 about the central pivot point x.

The arrangement of the torque transmitting bellows, as described above in connection with FIGS. 3, 6, and 7, is particularly advantageous from a number of standpoints, including the fact that the subdivision of the bellows into two parts, one arranged above the plane of rotation and the other below the plane of rotation of the blade retention ring, enables the employment of more flexible torque transmitting sheet material while maintaining the thickness of the material at a value which will not hinder the tilting motion of the blade retention ring about the center point x.

Figures 8, 8A, 10:
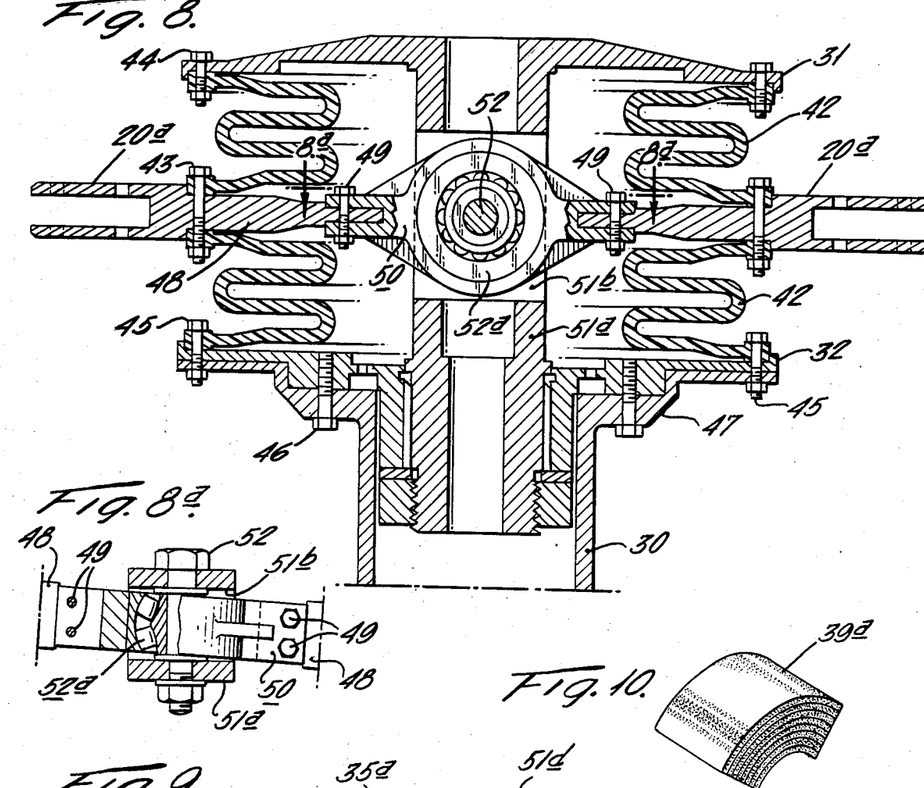
FIG. 8 is a view similar to FIG. 3 but illustrating a modified form of rotor system having two blades, instead of four blades shown in the embodiment of FIGS. 1 to 7 inclusive, this view illustrating the employment of the torque transmitting bellows above and below the rotor in a two-bladed rotor system in which the two blades are mounted by means of a horizontal pivot intersecting the axis of rotation.
FIG. 8a is a fragmentary detailed plan view on the line 8a–8a on FIG. 8.
FIG. 10 is a fragmentary perspective view of portions of the center joint shown in FIG. 9.
Figure 9:
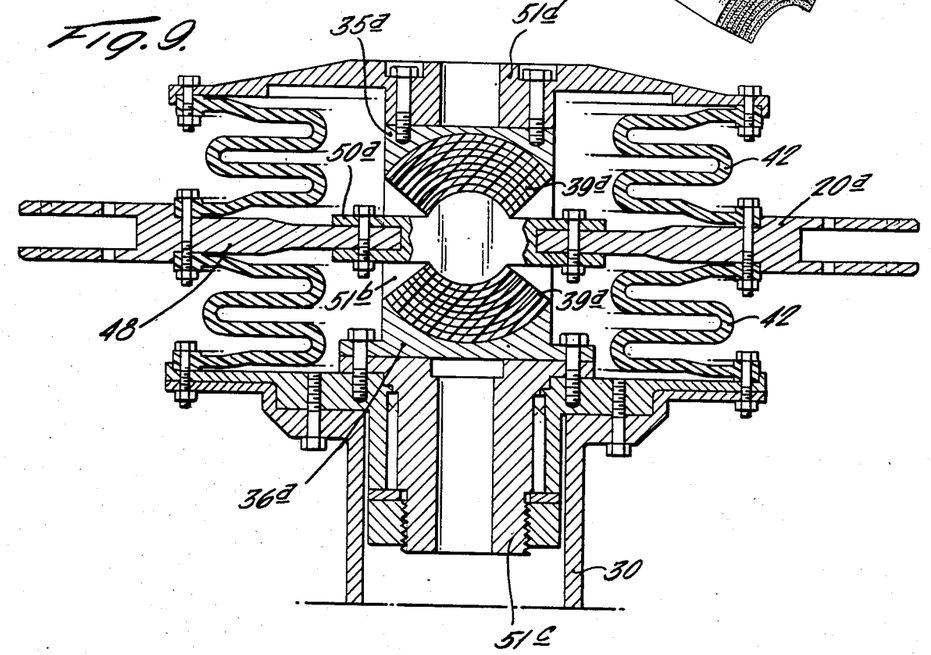
FIG. 9 is a view similar to FIG. 8 but illustrating an embodiment in which the central pivot for a bladed rotor, as shown in FIG. 8, is replaced by a multi-layer cylindrical flexible joint.

Such a driving bellows arrangement is also adaptable to other forms of bladed rotors, including, for example, the forms of rotors shown in FIGS. 8 and 9.

In FIG. 8, the rotor illustrated comprises only two rotor blades which may be connected with the forked fittings 20a which are provided on individual blade mounting links 48 which are fastened, as by bolts 49, with a central mounting piece 50 which is journaled on the rotor shaft 51a by means of a single central pivot 52, having surrounding roller or needle bearings, the center of this pivot intersecting the rotor axis, so that the blades connected with the forked fittings 20a may rock about the axis of the central pivot 52. It will be understood that in FIG. 8, the two blades here employed may be arranged in the general manner illustrated in FIG. 2 with respect to the employment of the flex straps 19 and the cyclic pitch control system.

In the embodiment of FIG. 8, the central shaft 51a is provided with laterally spaced flat or rectangular portions 51b providing a central transverse channel through which the central mounting piece 50 for the two rotor blades may extend, and the central pivot 52 may extend through and be secured to the portions 51b, thereby providing freedom for rocking movement of the mounting piece 50 with respect to the rotor shaft 51a. As in the embodiment shown in FIGS. 3 to 7, the central rotor shaft 51a is connected with the outer shaft 30 by means of a disc part 32 and an annular ring 47, these parts being connected with each other by means of bolts 46.

As in the embodiment described above, upper and lower flexible torque bellows 42 are also provided and are connected with the upper and lower parts 31 and 32 of the rotor shaft by means of bolts 44 and 45. The adjacent edges of the upper and lower bellows are also fastened to the blade mounting links 48 by means of bolts 43.

This torque or driving bellows arrangement is closely similar to that described above in connection with the first embodiment, but it is here noted that in the embodiment of FIG. 8, the central joint comprises a roller or needle bearing structure 52a surrounding the central pivot 52. With a construction of this type, it is preferred to provide some clearance for the common teetering pivot with respect to the central rotor shaft 51a, i.e., a freedom for some movement of the blades and the mounting pivot in a rotational sense about the axis of the rotor, so that rotor torque, particularly under rotor driving conditions, will be assumed by the flexible bellows 42 and will not impose appreciable torque force through the central teetering pivot. In this arrangement, it is also contemplated that, notwithstanding freedom provided for torsional movement of the blades with respect to the hub, the central pin 52 should also serve for transmission of rotor thrust from the central blade mounting piece 50 to the rotor hub 51a.

With the foregoing in mind, it is contemplated to employ spherical type of roller bearing for the central bearing structure 52a, as illustrated in FIGS. 8 and 8a. This provides for adjustment movement of the blade mounting piece 50 about the axis of the rotor thereby assuring that the rotor torque will be carried by the bellows 42 - 42 when the rotor is being driven.

In the embodiment of FIGS. 9 and 10, a teetering type of mounting for a pair of rotor blades is also provided. However, in this embodiment, instead of employing a central needle-bearing type of joint with the rotor shaft, the rotor shaft parts 51c and 51d are spaced vertically from each other and are interconnected with a fitting having laterally spaced flat or rectangular portions 51b (as in FIG. 8) providing a transverse channel through which the central blade mounting piece 50a extends.

Instead of employing a central roller bearing type of joint connecting the blade mounting piece 50a with the rotor shaft, the embodiment of FIGS. 9 and 10 includes a flexible joint of cylindrical form having a multiplicity of alternate layers of rubber and metal of construction similar to that described above in connection with FIGS. 3 and 4. This joint material is indicated in FIGS. 9 and 10 at 39a, and comprises alternate layers of rubber and metal bonded to each other. The layers in the joint of FIGS. 9 and 10 are cylindrical, rather than spherical as in FIGS. 3 to 7. This provides a yielding type of center joint about which a portion of the flapping motion of the pair of rotor blades may occur, particularly concurrent flapping motions of the two blades in opposite senses, i.e., one blade upwardly and the other blade downwardly. This joint 39a is accommodated between the concave cylindrical fittings 35a and 36a in a manner similar to the arrangement described above in connection with FIGS. 3 to 6.

As in the preceding embodiments, the arrangement of FIGS. 9 and 10 also contemplates the employment of the bellows components 42 for transmitting driving torque from the rotor shaft 30 to the forked blade mounting fittings 20a.

From the foregoing, it will be seen that the flexible bellows 42 may be employed as a torque transmitting system between the rotor blades and the rotor shaft in a variety of forms of equipment, in some of which relative angular or flapping motion of the blades in relation to the rotor mounting shaft is permitted by employment of a yielding central joint, or in which, particularly in the case of a teetering type of rotor embodying only a pair of blades, as in FIG. 8, relative angular motion is permitted by employing the spherical type of roller bearing 52a and by providing some clearance for relative angular motion of the central blade mounting piece 50 and the rotor shaft. Even where central flexible or yielding joints are employed, as in the embodiments of FIGS. 3 to 7, and FIGS. 9 and 10, additional freedom for relative angular motion may be provided by appropriate clearance of mounting parts, in order to assure that at least the primary torque force incident to the driving of the rotor will be carried by the flexible bellows.

Figure 11A:
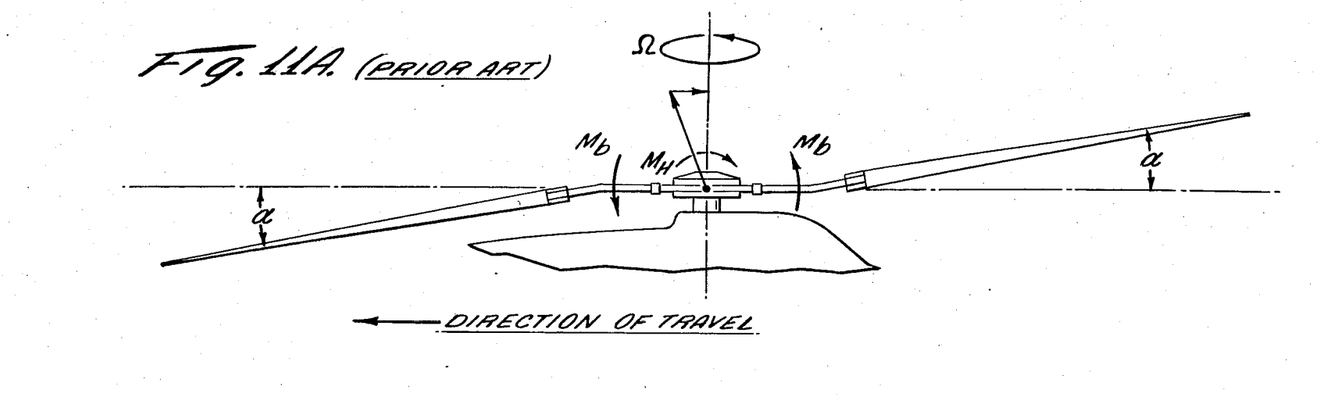
FIGS. 11A and 11B are somewhat diagrammatic side elevational views of two forms of rotors in translational flight, one rotor (in FIG. 11B) being of the form having a center flexible joint of the kind shown in FIGS. 1 to 10 inclusive, and the other rotor (in FIG. 11A) being of a form in which the center joint is not included, and illustrating a comparison between the blade positions in the two forms.
Figure 11B:
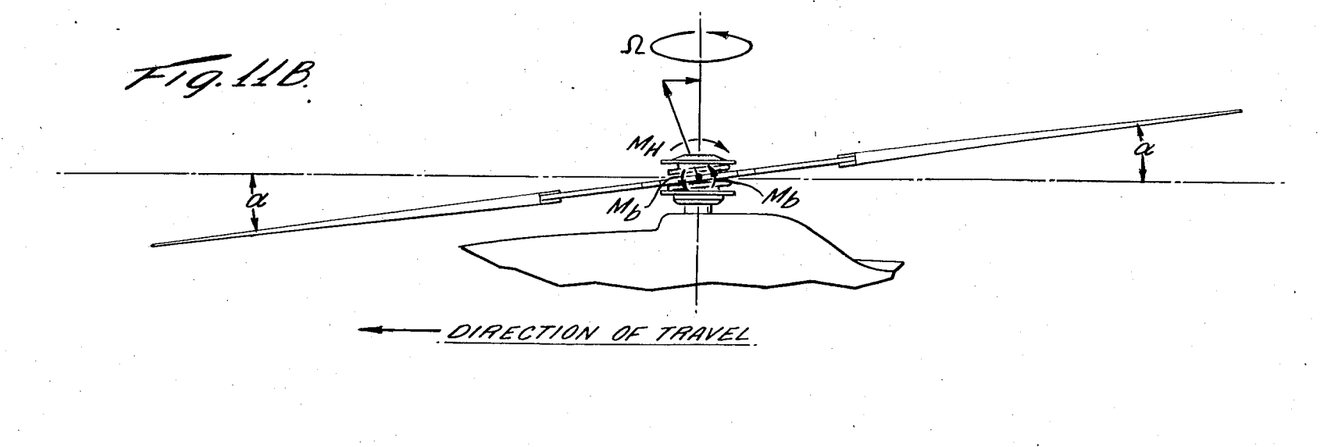

Turning now to FIGS. 11A and 11B it is first noted that these figures are somewhat diagrammatic representations of certain actions of a rotor constructed in accordance with the present invention (FIG. 11B) as compared with a rotor of prior art type (FIG. 11A) in which the central joint described above, for instance, in connection with FIGS. 3 to 7, is not employed. Thus, as shown in FIG. 11A, the arrangement requires that flapping motions of the blades occur entirely by virtue of the flex straps interconnecting the blades and the central hub structure, and this configuration necessarily encounters a Coriolis effect, with resultant undesirable forces and vibrations introduced into the system and communicated to the body of the aircraft.

Because of the presence of the central joint (FIG. 11B) as fully described above, particularly in connection with FIGS. 3 to 7 inclusive, the rotor drive is of constant velocity, and the Coriolis effect is substantially eliminated.

Further analysis of the preferred embodiment of rotor system, as disclosed in the present application, is given in the table appearing herebelow, which gives comparative figures for three types of rotors.

In Table 1 herebelow, the three types of rotors are marked with the letters A, B, and C, and a brief identification of each rotor is given in the table.

It will be seen that rotor A is identified as "Hingeless rotor", which is a term which has been applied to this form of rotor, and this refers to a rotor of the type in which the flapping action is provided by the employment of flex straps but in which pitch bearings are present in order to provide for pitch change motion of the rotor blades.

Rotor B is identified as "Bearingless rotor", which is a term which has been applied to this form of rotor, and this refers to a rotor of the type in which both the flapping action and the pitch change action are provided by the employment of flex straps.

The third type of rotor included in the table is identified as "Bearingless rotor with constant velocity joint and 'soft hub'". In the rotor here referred to, the flex straps are relied upon for both flapping and pitch change action of the rotor blades, and this rotor further includes both the central constant velocity joint disclosed in the present application, as well as the bellows driving or torque connection between the blades and the rotor hub, as is also disclosed in the present application.

The rotors in any one of the three categories (A, B, or C) referred to in the table may also include pivots providing for lead-lag motion of the blades, or the flex straps employed may be constructed to accommodate lead-lag motions, in addition to the other motions of the blades referred to.

hinge location and also the hub moments. It is particularly to be noted that with the rotor (C) of the present application, the virtual flapping hinge is even shifted closer to the center of rotation, thereby still further reducing hub moments.

In comparing the hub moments with respect to rotors of the types represented by A, B, and C in the above table, the following comparison is of significance.

A. $70 \times 10^3$ LB-IN—This represents very high vibration (1st Flap. Freq. 1.12 cyc/rev - Virtual Hinge Location 14.5%).

B. $35 \times 10^3$ LB-IN—This represents moderate vibration (1st Flap. Freq. 1.048 cyc/rev - Virtual Hinge Location 6.05%).

C. $18.31 \times 10^3$ LB-IN—This represents very low vibration (1st Flap. Freq. 1.021 cyc/rev - Virtual Hinge Location 3%).

From the foregoing, it will be seen that the arrangement of the present invention is capable of providing rotor operation with greatly reduced vibration characteristics.

I claim:

1. A bladed aircraft rotor comprising a rotative hub structure and a plurality of blades radiating from the hub structure, the hub structure including a driving shaft and a blade mounting ring surrounding the shaft, each blade having a flexible mounting strap connecting the blade with said mounting ring and providing freedom for flapping and pitch change motions of the blade with respect to the mounting ring, the driving shaft having means defining upper and lower bearing surfaces concavely spherically curved about a point on the axis of rotation of the hub structure, and the blade mounting ring having means defining upper and lower bearing surfaces convexly and concentrically curved about said point on the axis of rotation, flexible elastomeric means between the concentrically curved bearing surfaces for transmitting centrifugal thrust forces from the blade mounting straps to the hub structure while permitting blade motion substantially in a plane containing the axis of rotation of the hub structure, and means for transmitting torque force between the hub structure and the blades comprising flexible bellows above and below the blade mounting ring interconnecting the blade mounting ring with the drive shaft above and below the blade mounting ring, wherein the bellows serves mainly to drive the blades.

2. A bladed aircraft rotor as defined in claim 1 and further including means providing for pitch change motion of the blades with respect to the blade mounting ring.

TABLE 1

| TYPE OF ROTOR | BLADE 1ST FLAP. FREQ. PER REV. | BLADE 1ST CHORD. FREQ. PER REV. | VIRTUAL FLAPPING HINGE LOCATION | HUB MOMENT (LB-IN) $\times 10^3$ | AIRCRAFT G.W. |
|---|---|---|---|---|---|
| A HINGELESS ROTOR | 1.12 | .67 | 14.5% | 70 | 5100 LBS. |
| B BEARINGLESS ROTOR | 1.048 | .67 | 6.05% | 35 | 5100 LBS. |
| C BEARINGLESS ROTOR WITH CONSTANT VELOCITY JOINT AND "SOFT" HUB | 1.021 | .66 | 3% | 18.31 | 5100 LBS. |

As will be seen, Table 1 identifies certain characteristics of rotors in the three categories identified, each aircraft having a gross weight of 5100 lbs.

The values appearing in the column of the table referring to the "Blade 1st Flap. Freq. Per Rev." are of special significance and determine virtual flapping